(12) United States Patent
Baek et al.

(10) Patent No.: US 9,766,497 B2
(45) Date of Patent: Sep. 19, 2017

(54) CURVED BACKLIGHT UNIT AND DISPLAY DEVICE INCLUDING THE SAME

(71) Applicant: Samsung Display Co., Ltd., Yongin-si, Gyeonggi-do (KR)

(72) Inventors: Seung Hwan Baek, Seoul (KR); So Jeong La, Suwon-si (KR); Chan-Jae Park, Osan-si (KR); Yeong Bae Lee, Suwon-si (KR)

(73) Assignee: Samsung Display Co., Ltd. (KR)

( * ) Notice: Subject to any disclaimer, the term of this patent is extended or adjusted under 35 U.S.C. 154(b) by 111 days.

(21) Appl. No.: 14/950,149

(22) Filed: Nov. 24, 2015

(65) Prior Publication Data

US 2016/0231623 A1 Aug. 11, 2016

(30) Foreign Application Priority Data

Feb. 5, 2015 (KR) .................. 10-2015-0018229

(51) Int. Cl.
*G02F 1/133* (2006.01)
*G02F 1/1335* (2006.01)

(52) U.S. Cl.
CPC .. *G02F 1/133603* (2013.01); *G02F 1/133605* (2013.01); *G02F 1/133606* (2013.01); *G02F 1/133608* (2013.01)

(58) Field of Classification Search
CPC ......... G02F 1/133603; G02F 1/133605; G02F 1/133606; G02F 1/133608
See application file for complete search history.

(56) References Cited

U.S. PATENT DOCUMENTS

| 2013/0148376 A1 | 6/2013 | Nick et al. |
| 2014/0286049 A1* | 9/2014 | Cha ..................... G02B 6/0023 362/609 |

FOREIGN PATENT DOCUMENTS

| JP | 06-033181 U | 4/1994 |
| KR | 10-2013-0071061 A | 6/2013 |
| KR | 10-2013-0089295 A | 8/2013 |
| KR | 10-2013-0125637 A | 11/2013 |
| KR | 10-2013-0136259 A | 12/2013 |
| KR | 10-2014-0078840 A | 6/2014 |

* cited by examiner

*Primary Examiner* — Fei Fei Yeung Lopez
(74) *Attorney, Agent, or Firm* — Innovation Counsel LLP

(57) ABSTRACT

A curved backlight unit includes: a light source module; and a light source enhancing member disposed on the light source module, the light source module includes: a substrate; a light emitting part disposed on the substrate; a first reflecting sheet spaced apart from the light emitting part by a predetermined distance and enclosing the light emitting part; a second reflecting sheet contacting the first reflecting sheet; and a wavelength converting part fixed between the first reflecting sheet and the second reflecting sheet and overlapped with the light emitting part.

24 Claims, 18 Drawing Sheets

CURVED BACKLIGHT UNIT AND DISPLAY DEVICE INCLUDING THE SAME

CROSS-REFERENCE TO RELATED APPLICATION

This application claims priority to and the benefit of Korean Patent Application No. 10-2015-0018229 filed in the Korean Intellectual Property Office on Feb. 5, 2015, the entire contents of which are incorporated herein by reference.

BACKGROUND (a) Field of the Disclosure

The present disclosure relates to a curved backlight unit and a liquid crystal display including the same.

(b) Description of the Related Art

A liquid crystal display (LCD) a type of the flat panel display that is currently used and generally includes a liquid crystal material disposed between an upper substrate on which common electrodes, color filters, and the like, are formed and a lower substrate on which thin film transistors, pixel electrodes, and the like, are formed. By applying different potentials to the pixel electrodes and the common electrodes to form an electric field, the LCD device changes the arrangement of the liquid crystal molecules to adjust a transmittance of light to thereby display an image.

Since a liquid crystal display panel (LCD panel) itself of the liquid crystal display is a non-emissive light receiving device, the liquid crystal display generally includes a backlight unit disposed on a rear surface of the LCD panel to provide light to the LCD panel.

In the backlight unit, a cold cathode fluorescent lamp (CCFL) and a light emitting diode (LED) are generally used as a light source. Conventionally, the cold cathode fluorescent lamp (CCFL) having low power consumption and providing bright white light has been mainly used. However, recently, the use of the LED has gradually increased because the LED generally has better color reproducibility, longer lifespan, and lower power consumption compared to the CCFL.

The backlight unit may be categorized as an edge type backlight unit or a direct type backlight unit depending on the position of the light source for the LCD panel. The edge type backlight unit uses a scheme in which the light source is positioned on a side surface of the LCD panel to provide light from the side surface through a light guide plate, and the direct type backlight unit uses a scheme in which the light source is positioned on a rear surface of the LCD panel to provide light to the LCD panel. The direct type backlight unit has advantages; for example, it has high light utilization, is simply treated, does not have a limitation in a size of a display panel, and is relatively cheap.

When the LED, which is a point light source, is used as the light source of the direct type backlight unit, light directly emitted by the LED is not concentrated on an upper portion of a light emitting surface but is uniformly distributed over the entire LCD panel, and a wavelength converting part converting the LED light into light having a specific wavelength may be positioned above the light source.

The above information disclosed in this Background section is only for enhancement of understanding of the background of the disclosure and therefore may contain information that does not form the prior art that is already known in this country to a person of ordinary skill in the art.

SUMMARY

The present disclosure provides a curved backlight unit and a display device including the same having advantages of being bent depending on a backlight curvature while including a wavelength converting part fixed thereto.

An exemplary embodiment of the present disclosure provides a curved backlight unit including: a light source module; and a light source enhancing member disposed on the light source module, wherein the light source module includes: a substrate; a light emitting part disposed on the substrate;

a first reflecting sheet spaced apart from the light emitting part by a predetermined distance and enclosing the light emitting part; a second reflecting sheet contacting the first reflecting sheet; and a wavelength converting part fixed between the first reflecting sheet and the second reflecting sheet and overlapped with the light emitting part.

The first reflecting sheet may include: a first contact part contacting the substrate; a first body part spaced apart from the light emitting part by a predetermined distance and extending from the first contact part; a support part supporting the wavelength converting part and extending from the first body part; and a first through-hole through which light emitted from the light emitting part passes, and the second reflecting sheet may include: a second contact part contacting the first contact part; a second body part adhered to the first body part; a cover part covering a portion of the wavelength converting part and extending from the second body part; and a second through-hole through which light emitted from the wavelength converting part passes.

The support part may support a side surface of the wavelength converting part and a portion of a lower surface of the wavelength converting part and extend downwardly from the first body part, and the cover part may cover a portion of an upper surface of the wavelength converting part and extend from the second body part in a horizontal direction.

The support part may support a portion of a lower surface of the wavelength converting part and extend from the first body part in a horizontal direction, and the cover part may cover a side surface of the wavelength converting part and a portion of an upper surface of the wavelength converting part and protrude upwardly from the second body part.

The first body part and the second body part may extend from the first contact part and second contact part, respectively, at a predetermined angle from the substrate.

The light source module may be configured of a plurality of cells each including the first reflecting sheet, the second reflecting sheet, and the wavelength converting part.

In the plurality of cells, adjacent first contact parts may be connected to each other, and adjacent second contact parts may be connected to each other.

The plurality of cells may be formed in a square shape of which each side is 30 mm or less.

The plurality of cells may be formed with a height of 5 mm or less from the substrate.

Thicknesses of the first reflecting sheet and the second reflecting sheets may be in the range of 50 μm to 100 μm.

The first through-hole may be formed at a size larger than that of the second through-hole.

The curved backlight unit may further include an adhering member disposed between the first reflecting sheet and the second reflecting sheet.

The wavelength converting part may include a plurality of quantum dots.

The wavelength converting part may include a first glass layer and a second glass layer, and the plurality of quantum dots may be covered with the first glass layer the second glass layer.

The wavelength converting part may convert light in a first wavelength band into light in second and third wavelength bands and emit the converted light.

The light in the first wavelength band may be light emitted by a blue light emitting diode (LED).

Another exemplary embodiment of the present disclosure provides a manufacturing method of a curved backlight unit including: preparing a first reflecting sheet fixing a wavelength converting part onto the first reflecting sheet; putting a second reflecting sheet on the first reflecting sheet and the wavelength converting part; and attaching the first reflecting sheet and the second reflecting sheet onto a substrate including a light emitting part.

The first reflecting sheet may include: a first contact part contacting the substrate; a first body part spaced apart from the light emitting part by a predetermined distance and extending from the first contact part; a support part supporting the wavelength converting part and extending from the first body part; and a first through-hole through which light emitted from the light emitting part passes, and the second reflecting sheet may include: a second contact part contacting the first contact part; a second body part adhered to the first body part; a cover part covering a portion of the wavelength converting part and extending from the second body part; and a second through-hole through which light emitted from the wavelength converting part passes.

The support part may support a side surface of the wavelength converting part and a portion of a lower surface of the wavelength converting part and extend downwardly from the first body part, and the cover part may cover a portion of an upper surface of the wavelength converting part and extend from the second body part in a horizontal direction.

The support part may support a portion of a lower surface of the wavelength converting part and extend from the first body part in a horizontal direction, and the cover part may cover a side surface of the wavelength converting part and a portion of an upper surface of the wavelength converting part and protrude upwardly from the second body part.

Another exemplary embodiment of the present disclosure provides a curved display device including: a display panel; and a curved backlight unit providing light to the display panel, wherein the curved backlight unit includes: a light source module; and a light source enhancing member disposed on the light source module, the light source module including: a substrate; a light emitting part disposed on the substrate; a first reflecting sheet spaced apart from the light emitting part by a predetermined distance and enclosing the light emitting part; a second reflecting sheet contacting the first reflecting sheet; and a wavelength converting part fixed between the first reflecting sheet and the second reflecting sheet and overlapped with the light emitting part.

The first reflecting sheet may include: a first contact part contacting the substrate; a first body part spaced apart from the light emitting part by a predetermined distance and extending from the first contact part; a support part supporting the wavelength converting part and extending from the first body part; and a first through-hole through which light emitted from the light emitting part passes, and the second reflecting sheet may include: a second contact part contacting the first contact part; a second body part adhered to the first body part; a cover part covering a portion of the wavelength converting part and extending from the second body part; and a second through-hole through which light emitted from the wavelength converting part passes.

The support part may support a side surface of the wavelength converting part and a portion of a lower surface of the wavelength converting part and extend downwardly from the first body part, and the cover part may cover a portion of an upper surface of the wavelength converting part and extend from the second body part in a horizontal direction.

The support part may support a portion of a lower surface of the wavelength converting part and extend from the first body part in a horizontal direction, and the cover part may cover a side surface of the wavelength converting part and a portion of an upper surface of the wavelength converting part and protrude upwardly from the second body part.

Other features and advantages of the present disclosure, in addition to the technical objective described above, are described below or will be clearly understood by those of ordinary skill in the art to which the present disclosure pertains from the following description.

As described above, the present disclosure has the following effects.

In the curved backlight unit according to the present disclosure, the wavelength converting part is fixed between the first reflecting sheet and the second reflecting sheet so that the wavelength converting part formed in the glass type may be fixed without breaking at the time of bending the backlight. Furthermore, because the wavelength converting part is fixed between the first reflecting sheet and the second reflecting sheet, the manufacturing cost may be decreased, and a weight increase may be minimized.

In addition, other features and advantages of the present disclosure may be newly recognized through exemplary embodiments of the present disclosure.

DETAILED DESCRIPTION OF THE EMBODIMENTS

Exemplary embodiments of the present disclosure are described in detail with reference to the accompanying drawings so that those of ordinary skill in the art to which the present disclosure pertains may easily practice the present system and method. As those of ordinary skill in the art would realize, the described embodiments may be modified in various different ways, all without departing from the spirit or scope of the present disclosure.

In the accompanying drawings, thicknesses were enlarged or exaggerated in order to clearly represent several layers and regions. It will be understood that when an element such as a layer, film, region, or substrate is referred to as being "on" another element, it may be directly on the other element, or intervening elements may also be present. In contrast, when an element is referred to as being "directly on" another element, there are no intervening elements present.

Hereinafter, a curved backlight unit and a curved display device including the same according to an exemplary embodiment of the present disclosure are described in detail with reference to the accompanying drawings.

Figure 1:
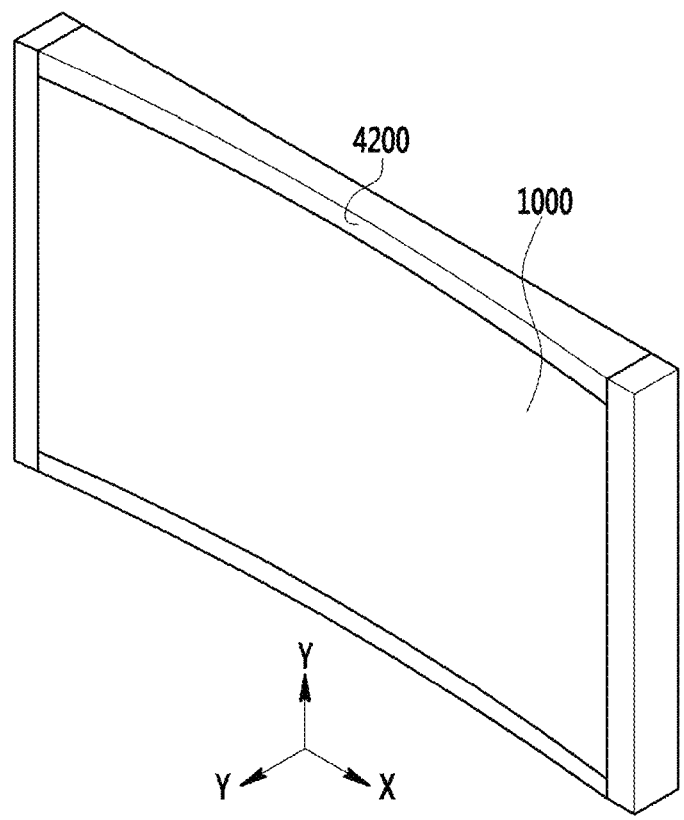
FIG. 1 is a perspective view for describing a curved display device according to an exemplary embodiment of the present disclosure.
Figure 2:
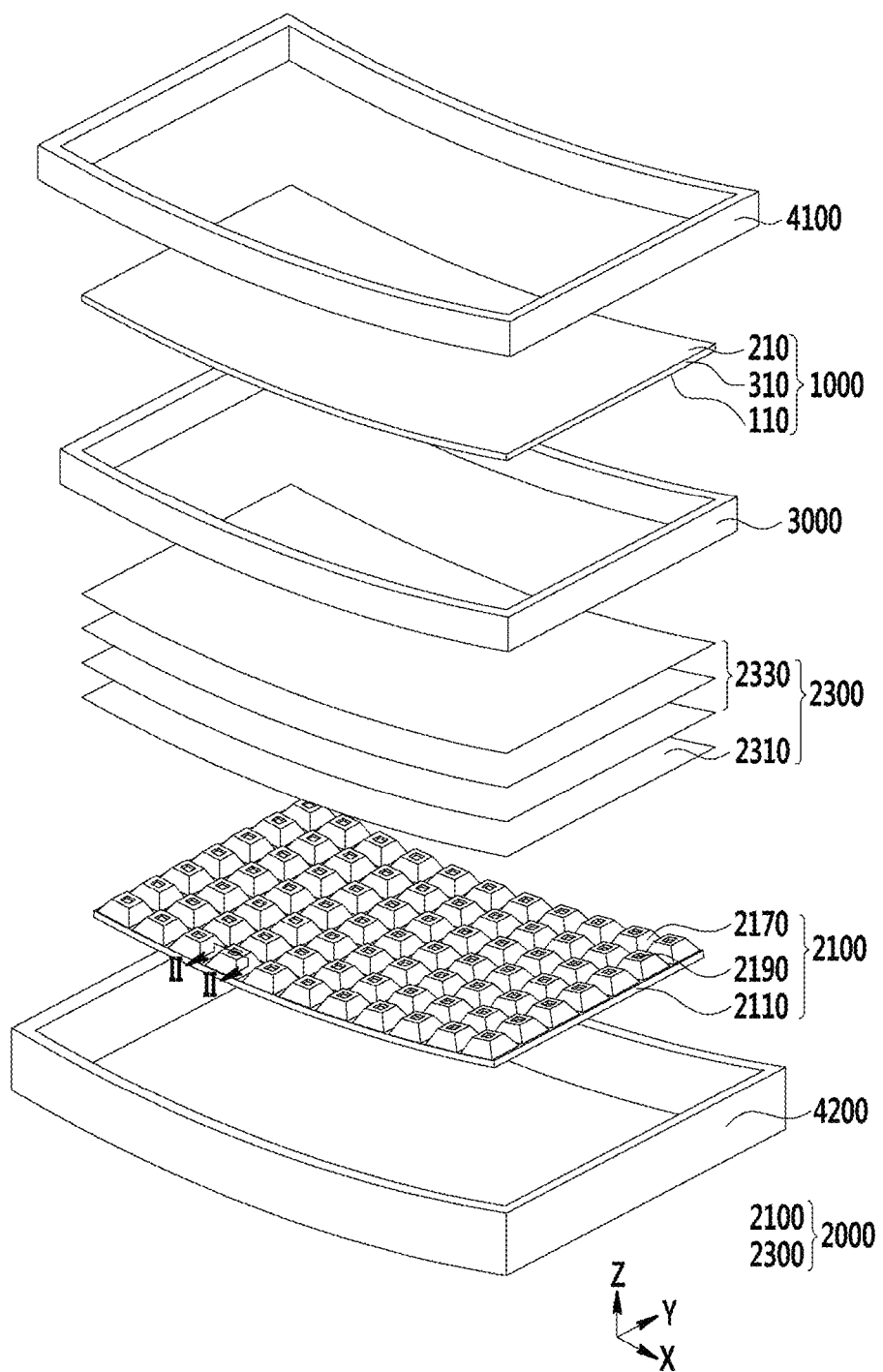
FIG. 2 is an exploded perspective view for describing the curved display device shown in FIG. 1.
Figure 3:
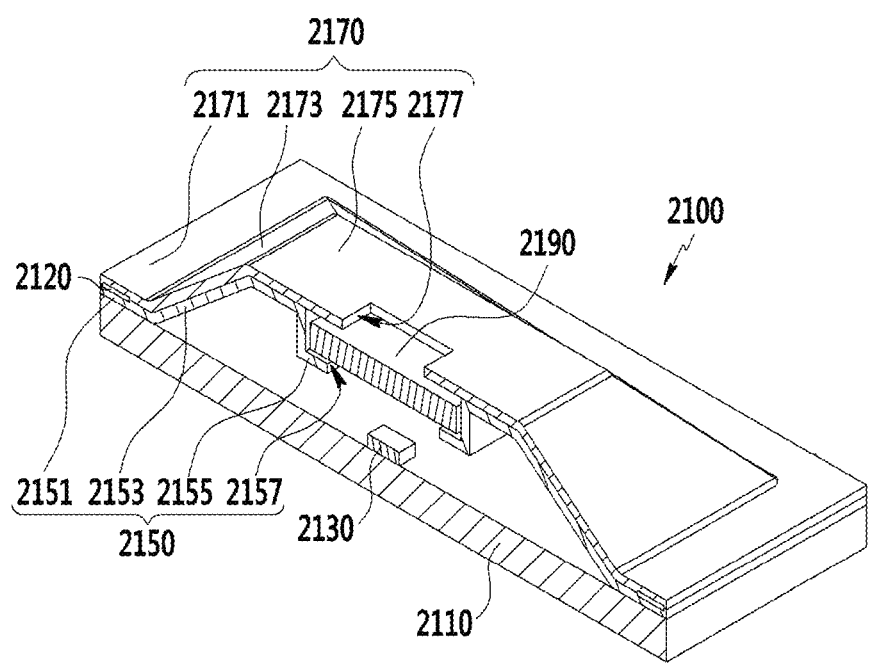
FIG. 3 is a perspective view of a light source module according to an exemplary embodiment of the present disclosure.
Figure 4:
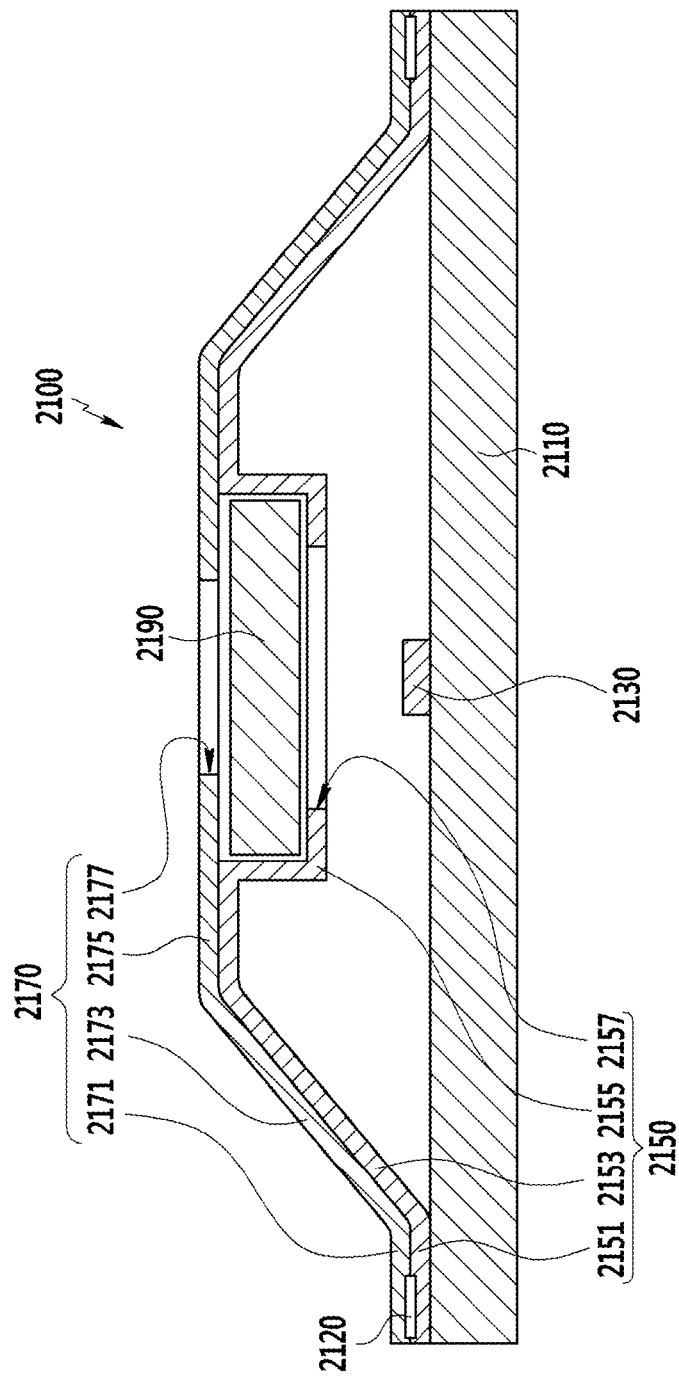
FIG. 4 is a cross-sectional view of the light source module according to an exemplary embodiment of the present disclosure.
Figure 5:
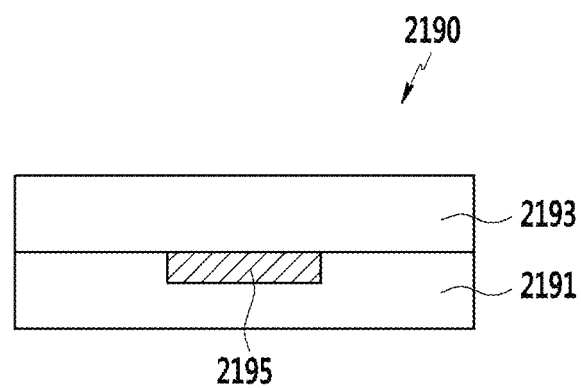
FIG. 5 is a cross-sectional view of a wavelength converting part according to an exemplary embodiment of the present disclosure.

FIG. 1 is a perspective view for describing a curved display device according to an exemplary embodiment of the present disclosure. FIG. 2 is an exploded perspective view for describing the curved display device shown in FIG. 1. FIG. 3 is a perspective view of a light source module according to an exemplary embodiment of the present disclosure taken along line III-III of FIG. 2. FIG. 4 is a cross-sectional view of the light source module according to an exemplary embodiment of the present disclosure taken along line III-III of FIG. 2. FIG. 5 is a cross-sectional view of a wavelength converting part according to an exemplary embodiment of the present disclosure.

First, referring to FIGS. 1 and 2, the curved display device according to an exemplary embodiment of the present disclosure includes a display panel 1000, a curved backlight unit 2000, a mold frame 3000, a top chassis 4100, and a bottom chassis 4200.

The curved display device is concavely bent with a predetermined curvature when viewed on an XY plane.

The curved backlight unit 2000 supplies light to the display panel 1000, and the display panel 1000 controls the light supplied thereto to display an image.

The mold frame 3000 is positioned between the display panel 1000 and the curved backlight unit 2000.

The top chassis 4100 protects the display panel by enclosing a rim of the display panel 1000, and prevents the display panel 1000 from being separated from the curved backlight unit 2000. Any one or both of the mold frame 3000 and the top chassis 410 may be omitted according to an exemplary embodiment.

The bottom chassis 4200 accommodates the curved backlight unit 2000 therein. The bottom chassis 4200 is a container having an opened upper portion and an accommodating space having a predetermined depth. The bottom chassis 420 may have, for example, an overall quadrangular tray shape.

The display panel 1000 may have a curved shape with a predetermined curvature when viewed on the XY plane. The display panel 1000 may be a liquid crystal display (LCD) panel, a plasma display panel, or the like.

The display panel 1000 according to an exemplary embodiment of the present disclosure is an LCD panel including a lower panel 110, an upper panel 210 facing the lower panel 110, and a liquid crystal layer 310 interposed between the lower panel 110 and the upper panel 210.

The lower panel 110 and the upper panel 210 are bent with a predetermined curvature. The upper panel 210 positioned at an inner side with respect to the center of a curvature radius and the lower panel 110 positioned at an outer sided with respect to the center of the curvature radius are constantly bent so as to have the same curvature radius. Here, the center of the curvature radius in a horizontal direction is positioned at an outer side of the upper panel 210, that is, a side at which an observer is positioned.

The display panel 1000 may be curved or bent so as to have a predetermined curvature before being inserted into the top chassis 4100 or be curved after being inserted into the top chassis 4100. For example, when the display panel 1000 is a flexible type display panel, the display panel 100 may be curved after being inserted into the top chassis 4100. When the display panel 1000 is a rigid type display panel, the display panel 100 may be manufactured so as to have a curved shape with a predetermined curvature before being inserted into the top chassis 4100.

The lower panel 110 includes a transparent insulation substrate, such as a glass substrate, and a plurality of thin film transistors, data lines, gate lines, pixel electrodes, and the like, formed on the transparent insulation substrate. The data line is connected to a source terminal of the thin film transistor, and the gate line is connected to a gate terminal of the thin film transistor. The pixel electrode made of a transparent conductive material, such as an indium tin oxide (ITO), is connected to a drain terminal of the thin film transistor.

The upper panel 210 positioned to face the lower panel 110 includes a transparent insulation substrate and color filters, common electrodes, and the like, formed on the transparent insulation substrate. The color filter may include color filters that may represent primary colors such as a red, a green, a blue, and the like, respectively. The common electrode is made of a transparent conductive material such as an indium tin oxide (ITO) or an indium zinc oxide (IZO). At least one of the color filter and the common electrode may also be positioned on the lower panel 110.

The lower panel 110 and the upper panel 210 have a polarizer attached thereto, respectively. The polarizer may serve to polarize light incident to the LCD panel to transmit only light vibrating in one direction therethrough.

In the LCD panel, when the thin film transistor is turned on by a signal applied to the gate line, a signal applied to the data line is applied to the pixel electrode. When this happens, an electric field having a predetermined strength is formed between the pixel electrode and the common electrode to control alignment of liquid crystal molecules of the liquid crystal layer. As a result, the transmittance of light passing the liquid crystal layer 310 is adjusted to display an image.

The curved display device includes at least one driving apparatus (not shown), such as a driver or a controller, controlling signals applied to the display panel 1000. The driving apparatus may be mounted in an integrated circuit (IC) chip form on the display panel 1000 or be mounted on a printed circuit board (PCB) or a flexible printed circuit board (FPCB) and be electrically connected to the display panel 1000. Any driving apparatus may also be integrated on the display panel 1000.

The curved backlight unit 2000 for providing light to the display panel 1000 is positioned below the display panel 1000.

The curved backlight unit 2000, which is a direct type backlight unit, includes a light source module 2100 and a light source enhancing member 2300.

The light source module 2100 is configured of a substrate 2110 and a plurality of cells including a light emitting part 2130, a first reflecting sheet 2150, a second reflecting sheet 2170, and a wavelength converting part 2190.

The substrate 2110 supplies power to the light emitting parts 2130 and supports the light emitting parts 2130, the first reflecting sheets 2150, and the second reflecting sheets 2170. The substrate 2110 may be a circuit board, for example, a metal core printed circuit board (MCPCB) that may rapidly radiate heat generated in the light emitting part 2130.

The light emitting part 2130 is electrically connected to a wiring of the substrate 2110, receives the power supplied from the substrate, converts electrical energy into optical energy, and then emits the optical energy. A plurality of light emitting parts 2130 may be disposed at predetermined intervals on the substrate 2110, and the total number and disposition of light emitting parts 2130 may be variously changed depending on the size of the display panel, the output of a light source, and the like.

The light emitting part 2130 may be a light emitting diode (LED) package, and is mounted on the substrate 2110 with a light emitting surface of the LED package directed toward the display panel 1000.

The light emitting part 2130 may be formed of a colored LED that emits colored light, such as a red, a blue, a green, and the like, or a white LED. In addition, the colored LED may include at least one of a red LED, a blue LED, and a green LED, and disposition of these light emitting diodes (LEDs) and light emitted from these light emitting diodes (LEDs) may be variously modified and applied. In addition, the light emitting part 2130 may be a cathode fluorescent lamp (CCFL).

Although not shown, an optical lens substantially covering the light emitting parts 2130 may be mounted on the substrate 2110. Light emitted from the light emitting parts 2130 is refracted and diffused through the optical lens. The optical lens diffuses the light of the light emitting parts 2130 directed upwardly so as not to be concentrated, thereby making it possible to use a smaller number of light emitting parts 2130 and provide a high output light source.

The first reflecting sheets 2150 supporting the wavelength converting parts 2190 and enclosing the light emitting parts 2130 are disposed on the substrate 2110.

The first reflecting sheet 2150 may include a first contact part 2151, a first body part 2153, a support part 2155, and a first through-hole 2157.

The first contact part 2151 contacts the substrate 2110 and encloses the light emitting part 2130 such that it is spaced apart from the light emitting part 2130 by a predetermined distance on the XY plane.

The first body part 2153 extends from the first contact part 2151 and approaches the light emitting part at a predetermined angle from the substrate 2110.

That is, the first body part 2153 is formed to enclose the light emitting part 2130 while being spaced apart from the light emitting part 2130 by a predetermined distance, thereby preventing the light emitted from the light emitting part 2130 positioned in the first reflecting sheet 2150 from being leaked to the outside.

The support part 2155 supports the wavelength converting part 2190 and extends from the first body part 2153.

In detail, the support part 2155 may support a side surface of the wavelength converting part 2190 and a portion of a lower surface of the wavelength converting part 2190 and extend downwardly from the first body part 2153.

Here, the support part 2155 of the first reflecting sheet 2150 is formed with the same height as that of the wavelength converting part 2190 and with the same width as that of the wavelength converting part 2190, such that it fixes the wavelength converting part 2190 together with the second reflecting sheet 2170.

Here, the first reflecting sheet 2150 may include the first through-hole 2157.

Here, the first through-hole 2157 may be positioned at the center of the support part 2155. That is, the first through-hole 2157 is formed in the support part 2155 and overlaps with the light emitting part 2130, thereby allowing the light emitted from the light emitting part 2130 to be incident to the wavelength converting part 2190.

The first reflecting sheet 2150 may be formed at a thickness of 50 μm to 100 μm so as to support the wavelength converting part 2190.

The first reflecting sheet 2150 may be formed in a dome shape with the first through-hole 2157 opened at the center thereof, and a rim of the first reflecting sheet 2150, that is, the first contact part 2151, may be formed in a square shape.

A horizontal side and a vertical side of the first reflecting sheet 2150 may be formed at a length of 30 mm or less, and the light emitting part 2130 may be positioned at the center of the first reflecting sheet 2150.

In addition, the height of the first reflecting sheet 2150, that is, the height of the substrate 2110 to the support part 2155 may be 5 mm or less so that all of the light emitted from the light emitting part 2130 may be incident to the wavelength converting part 2190, thereby improving light efficiency.

The second reflecting sheet 2170 is positioned on the first reflecting sheet 2150 and the wavelength converting part 2190.

The second reflecting sheet 2170 may include a second contact part 2171, a second body part 2173, a cover part 2175, and a second through-hole 2177.

The second contact part 2171 contacts the first contact part 2151 of the first reflecting sheet 2150, and the second body part 2173 contacts the first body part 2153 of the first reflecting sheet 2150.

The second body part 2173 extends from the second contact part 2171 and approaches the light emitting part 2130 at a predetermined angle from the substrate 2110.

That is, the second body part 2173 may be formed to enclose the light emitting part 2130 while being spaced apart from the light emitting part 2130 by a predetermined distance. Here, the first body part 2153 and the second body part 2173 extend from the first contact part 2151 and second contact part 2171, respectively, at the same angle from the substrate 2110.

The cover part 2175 covers a portion of an upper surface of the wavelength converting part 2190 and extend from the second contact part 2171 in the horizontal direction.

The second reflecting sheet 2170 may include the second through-hole 2177 positioned at the center of the cover part 2175 and overlapped with the light emitting part 2130, so that the second through-hole may emit the light therethrough.

That is, the light emitting part 2130, the first through-hole 2157, the wavelength converting part 2190, and the second through-hole 2177 are sequentially formed on the substrate 2110 so as to be overlapped with each other.

Here, the light efficiency of the display device may be increased by forming the first through-hole 2157 at a size larger than that of the second through-hole 2177. That is, when the first through-hole 2157 is formed at a size larger than that of the second through-hole 2177, the light incident from the light emitting part 2130 to the wavelength converting part 2190 through the first through-hole 2157 may be more efficiently emitted to the display panel 1000 through the second through-hole 2177.

The light source module 2100 as described above may be configured of a plurality of cells having a square shape of which each side is 30 mm or less.

Each cell may include the light emitting part 2130, the first reflecting sheet 2150, the wavelength converting part 2190, and the second reflecting sheet 2170.

In the plurality of cells, adjacent first contact parts 2151 are connected to each other, and adjacent second contact parts 2171 are connected to each other.

The first reflecting sheet 2150 and the second reflecting sheet 2170 may adhere to each other by an adhering member 2120.

The adhering member 2120 may be positioned between the first contact part 2151 and the second contact part 2171. The adhering member 2120 may be made of epoxy, silicon, or acryl.

In addition, although not shown, an adhering member may be further included between the substrate 2110 and the first contact part 2151.

The wavelength converting part 2190 may be positioned between the first reflecting sheet 2150 and the second reflecting sheet 2170.

The wavelength converting part 2190 may be fixed by the support part 2155 of the first reflecting sheet 2150 and the cover part 2175 of the second reflecting sheet 2170.

The light emitted from the light emitting part 2130 is incident to the wavelength converting part 2190 through the first through-hole 2157, and is discharged through the second through-hole 2177.

Referring to FIG. 5, the wavelength converting part 2190 may include a first glass layer 2191, a second glass layer 2193, and a plurality of quantum dots 2195.

The quantum dots 2195 may selectively convert light having a specific wavelength. That is, the quantum dots 2195 may convert light in a first wavelength band into light in second and third wavelength bands and then emit the converted light.

As an example, when the light emitting diode (LED), which is the light emitting part 2130, emits light in a blue wavelength band, the quantum dots 2195 may transmit a portion of the light in the blue wavelength band therethrough as it is and convert the other portion of the light in the blue wavelength band into light in green and red wavelength bands and then provide the converted light to the upper surface. Therefore, light passing through the quantum dot 2195 becomes white light because the blue light having the original wavelength and the converted green light and red light are mixed with each other when they are emitted.

The plurality of quantum dots 2195 may be covered with the first glass layer 2191 and the second glass layer 2193. Although not shown, the plurality of quantum dots 2195 may be dispersed in a resin layer between the first glass layer 2191 and the second glass layer 2193.

The first glass layer 2191 and the second glass layer 2193 may be made of a transparent material in order to emit light incident thereto as it is.

The light source enhancing member 2300 for improving efficiency of the light emitted from the light source module 2100 may be positioned between the light source module 2100 and the display panel 1000.

The light source enhancing member 2300 may include a diffusion sheet 2310 and a plurality of optical sheets 2330. The diffusion sheet 2310 diffuses the light emitted from the light source module 2100 and emits the diffused light to the optical sheets 2330.

The optical sheets 2330 are positioned over the diffusion sheet 2310 and improves the efficiency of the light incident from the diffusion sheet 2310 thereto.

The optical sheet 2330 may include a prism sheet, a protecting sheet, and the like.

The prism sheet adjusts the movement direction of the light uniformly diffused by the diffusion sheet 2310 to collect the light, thereby increasing luminance. The protecting sheet protects a prism of the prism sheet from being scratched, or the like. The protecting sheet may also serve to diffuse the light to widen the viewing angle narrowed by the prism sheet. According to some exemplary embodiments, the optical sheet 2330 may not include any of the prism sheet and the protecting sheet, or may include a plurality of any of the prism sheet and the protecting sheet.

The optical sheet 2330 may further include an optical sheet having other characteristics. For example, the optical sheet 2330 may include a polarization sheet that separates polarization components of the light and transmits and reflects the polarization components to improve luminance efficiency.

Next, a light source module according to another exemplary embodiment of the present disclosure described with reference to FIGS. 6 and 7.

Figure 6:
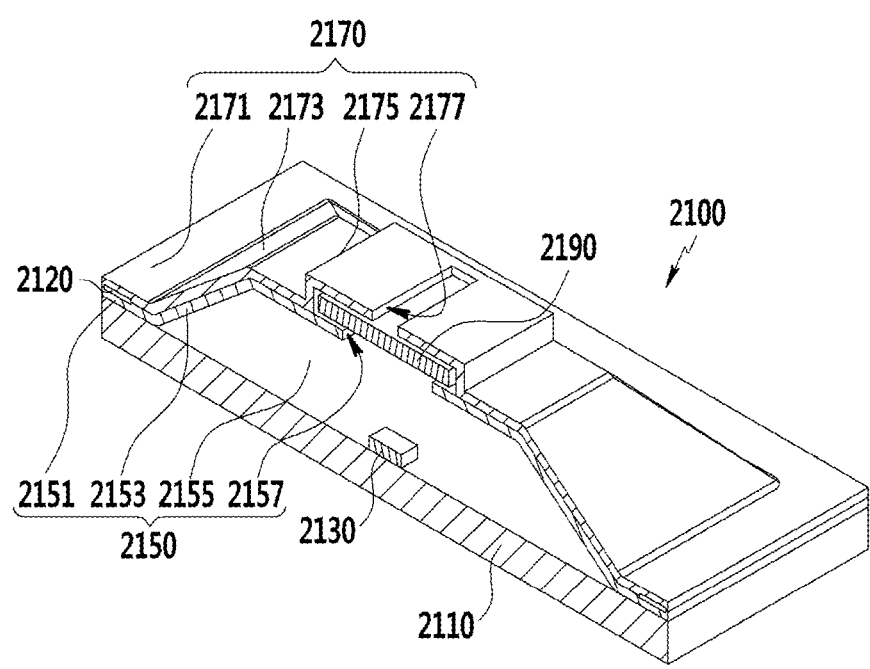
FIG. 6 is a perspective view of a light source module according to another exemplary embodiment of the present disclosure.

FIG. 6 is a perspective view of a light source module according to another exemplary embodiment of the present disclosure taken along line III-III of FIG. 2. FIG. 7 is a cross-sectional view of the light source module according to another exemplary embodiment of the present disclosure taken along line III-III of FIG. 2. The light source module shown in FIGS. 6 and 7 is the same as the light source module shown in FIGS. 3 and 4 except for the structures of the first reflecting sheet 2150 and the second reflecting sheet 2170. Therefore, the same components are denoted by the same reference numerals, and a repeated description for the same configurations is omitted.

Figure 7:
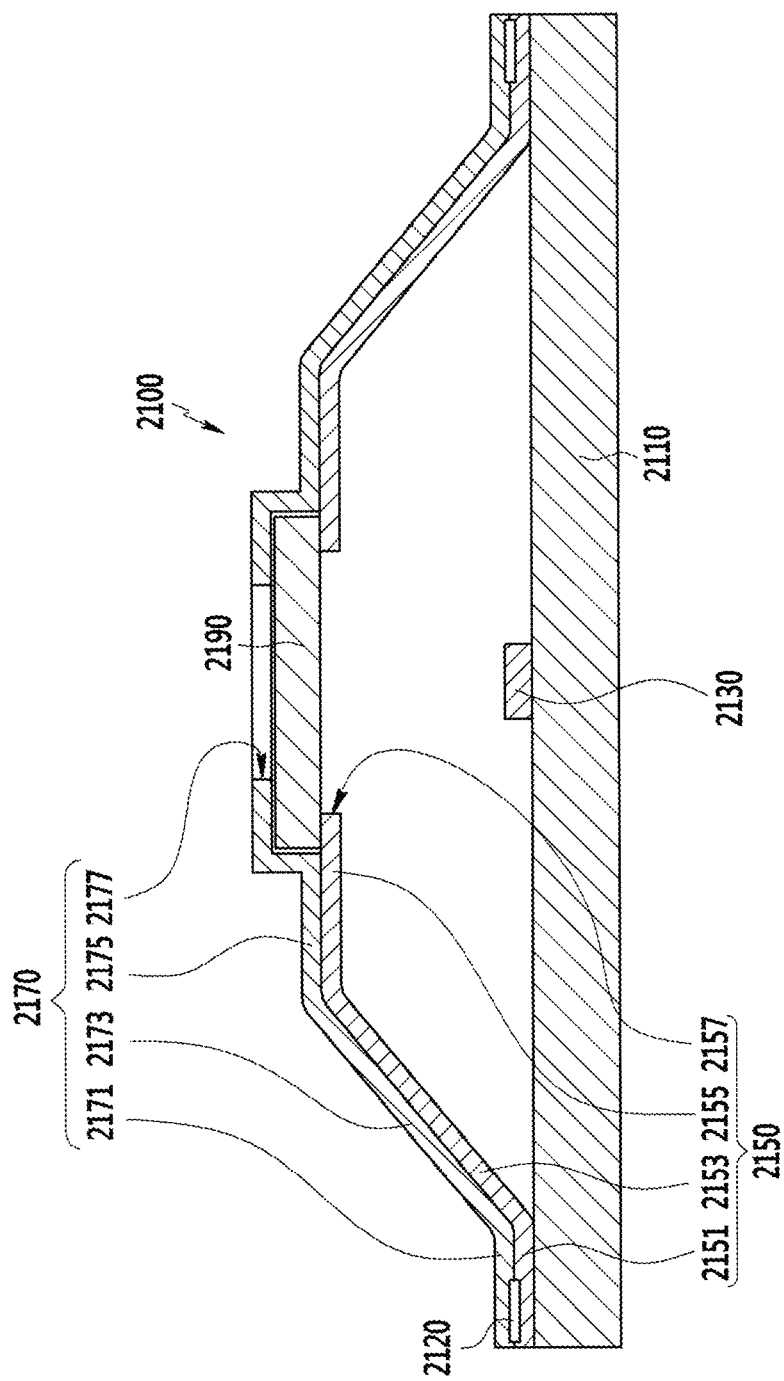
FIG. 7 is a cross-sectional view of the light source module according to another exemplary embodiment of the present disclosure.

Referring to FIGS. 6 and 7, the light source module 2100 according to another exemplary embodiment of the present disclosure includes a substrate 2110, a light emitting part 2130, a first reflecting sheet 2150, a second reflecting sheet 2170, and a wavelength converting part 2190.

The first reflecting sheet 2150 may include a first contact part 2151, a first body part 2153, a support part 2155, and a first through-hole 2157.

The support part 2155 may support a portion of a lower surface of the wavelength converting part 2190 and extend from the first body part 2153 in the horizontal direction.

The second reflecting sheet 2170 may include a second contact part 2171, a second body part 2173, a cover part 2175, and a second through-hole 2177.

The cover part 2175 may protrude from the second body part 2173 and cover a side surface of the wavelength converting part 2190 and a portion of an upper surface of the wavelength converting part 2190.

The light source module 2100 shown in FIGS. 3 and 4 is formed such that the support part 2155 of the first reflecting sheet 2150 and extends downwardly from the body part 2173 to enclose the wavelength converting part 2190, and the cover part 2175 of the second reflecting sheet 2170 covers a portion of the upper surface of the wavelength converting part 2190. In contrast, the light source module 2100 shown in FIGS. 6 and 7 is formed such that the support part 2155 of the first reflecting sheet 2150 extends horizontally from the body part 2153 and supports the wavelength converting part 2190, and the cover part 2175 of the second reflecting sheet 2170 encloses the wavelength converting part 2190.

Next, a light source module according to a Comparative Example of the present disclosure is described with reference to FIGS. 8 and 9.

Figure 8:
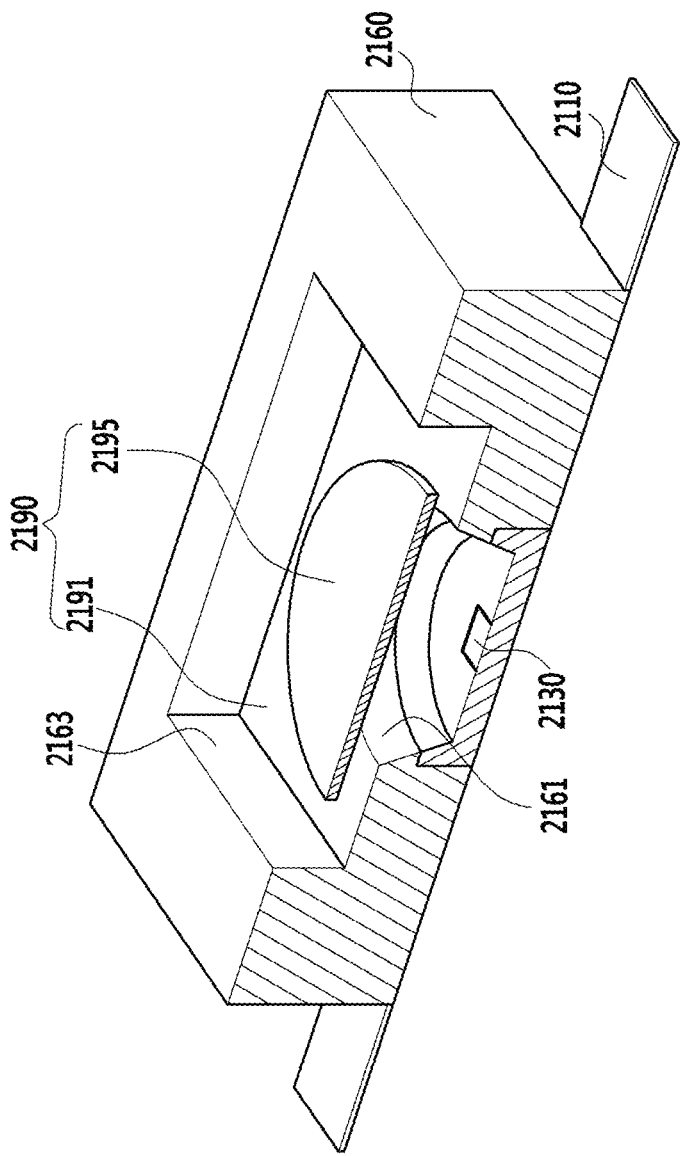
FIG. 8 is a perspective view of a light source module according to a Comparative Example of the present disclosure.

FIG. 8 is a perspective view of a light source module according to a Comparative Example of the present disclosure. FIG. 9 is a cross-sectional view of the light source module according to the Comparative Example of the present disclosure.

Figure 9:
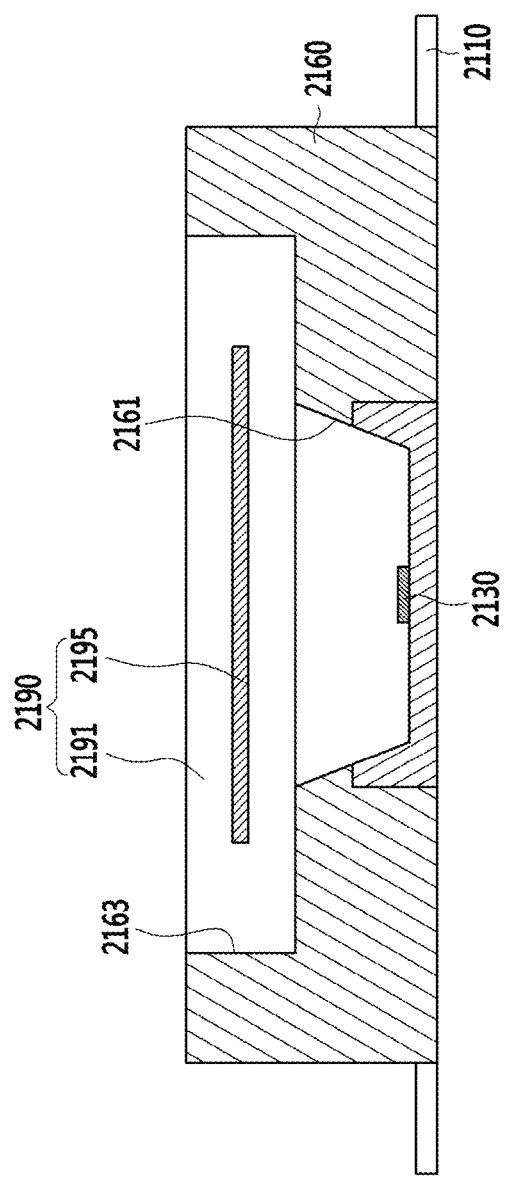
FIG. 9 is a cross-sectional view of the light source module according to the Comparative Example of the present disclosure.

Referring to FIGS. 8 and 9, the light source module according to the Comparative Example of the present disclosure may include a substrate 2110, a light emitting part 2130, a support frame 2160, and a wavelength converting part 2190.

A light emitting diode (LED) package including the light emitting part 2130 is disposed on the substrate 2110.

The center of the support frame 2160 may be provided with an opening 2161 enclosing the light emitting part 2130 and an accommodating part 2163 accommodating the wavelength converting part 2190.

The accommodating part 2163 may be formed at a size larger than that of the opening 2161 to support the wavelength converting part 2190 and pass the light emitted from the light emitting part 2130 therethrough.

The support frame 2160 may be formed as a mold type having a predetermined height such that the wavelength converting part 2190 is spaced apart from the light emitting part 2130 by a predetermined distance.

Since the light source module according to Comparative Example of the present disclosure as described above includes the support frame 2160 formed in the mold type to accommodate the wavelength converting part 2190 therein, the wavelength converting part 2190 formed as a glass type may be broken at the time of bending the backlight, and the manufacturing cost and weight are increased.

In the curved backlight unit according to an exemplary embodiment of the present disclosure, the wavelength converting part 2190 is fixed between the first reflecting sheet 2150 and the second reflecting sheet 2170, such that the wavelength converting part 2190 formed in the glass type is protected even at the time of bending the backlight.

In addition, the curved backlight unit according to an exemplary embodiment of the present disclosure does not include the support frame formed as the mold type to accommodate the wavelength converting part 2190, but uses the first reflecting sheet 2150 and the second reflecting sheet 2170, thereby decreasing the manufacturing cost and minimizing weight increase.

An overlapped description for repeated portions in materials, structures, and the like, of each component is omitted.

Next, a manufacturing method of the light source module according to an exemplary embodiment of the present disclosure is described with reference to FIGS. 10 to 18.

Figure 10:
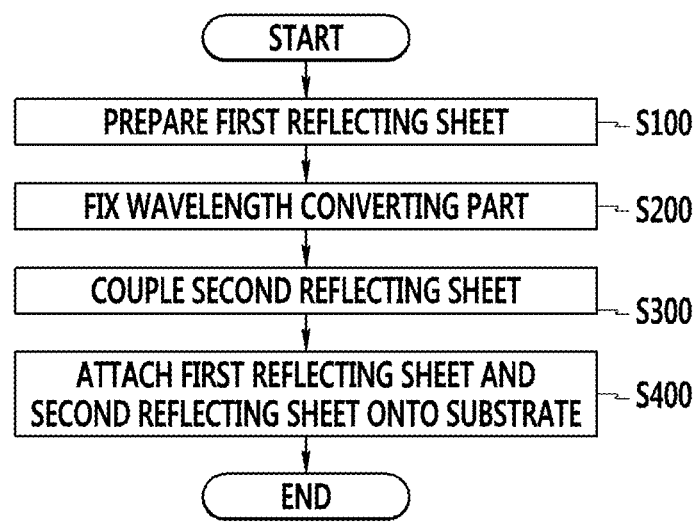
FIG. 10 is a flow chart showing a manufacturing method of the light source module according to an exemplary embodiment of the present disclosure.

FIG. 10 is a flow chart showing a manufacturing method of the light source module according to an exemplary embodiment of the present disclosure. FIGS. 11 to 18 are views showing the manufacturing method of the light source module according to an exemplary embodiment of the present disclosure.

Figure 11:
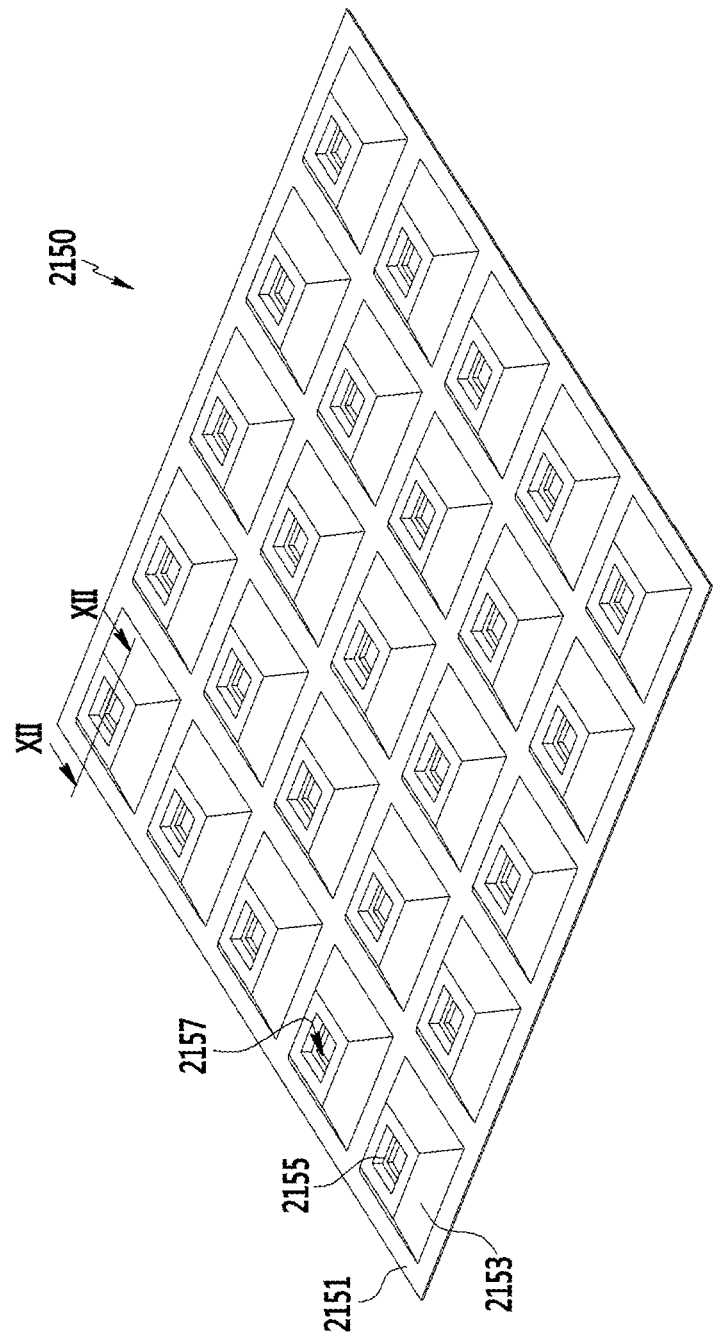
FIG. 11 is a perspective view showing the manufacturing method of the light source module according to an exemplary embodiment of the present disclosure.
Figure 12:
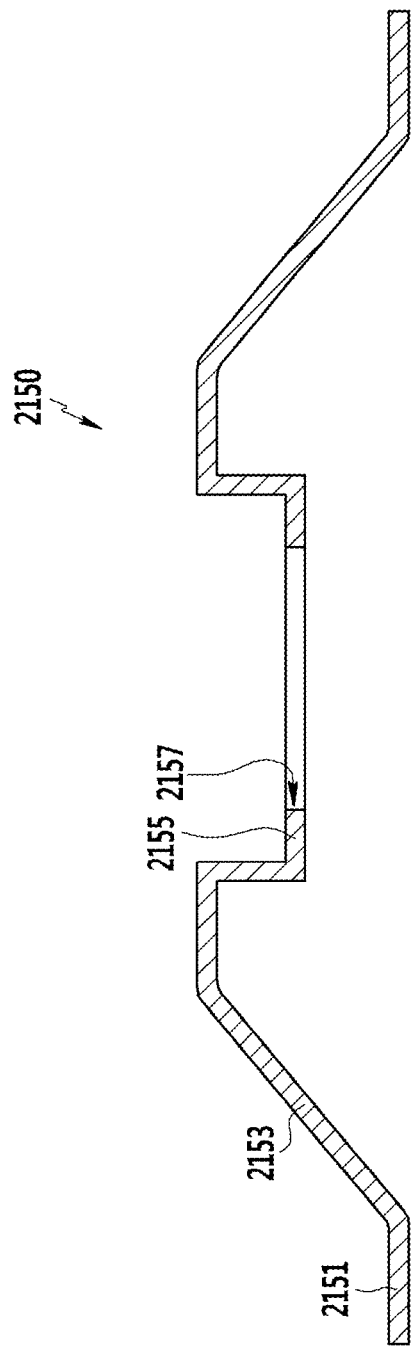
FIG. 12 is a cross-sectional view taken along line XII-XII of FIG. 11.

First, as shown in FIGS. 10 to 12, the first reflecting sheet 2150 is prepared (S100).

The first reflecting sheet 2150 may be configured of the plurality of cells each including the first contact part 2151, the first body part 2153, the support part 2155, and the first through-hole 2157.

In the plurality of cells, adjacent first contact parts 2151 are connected to each other.

The first body part 2153 extends upwardly from the first contact part 2151 at a predetermined angle, and the support part 2155 may extend downwardly from the first body part 2153.

Each cell of the first reflecting sheet 2150 is provided with the first through-hole 2157.

Figure 13:
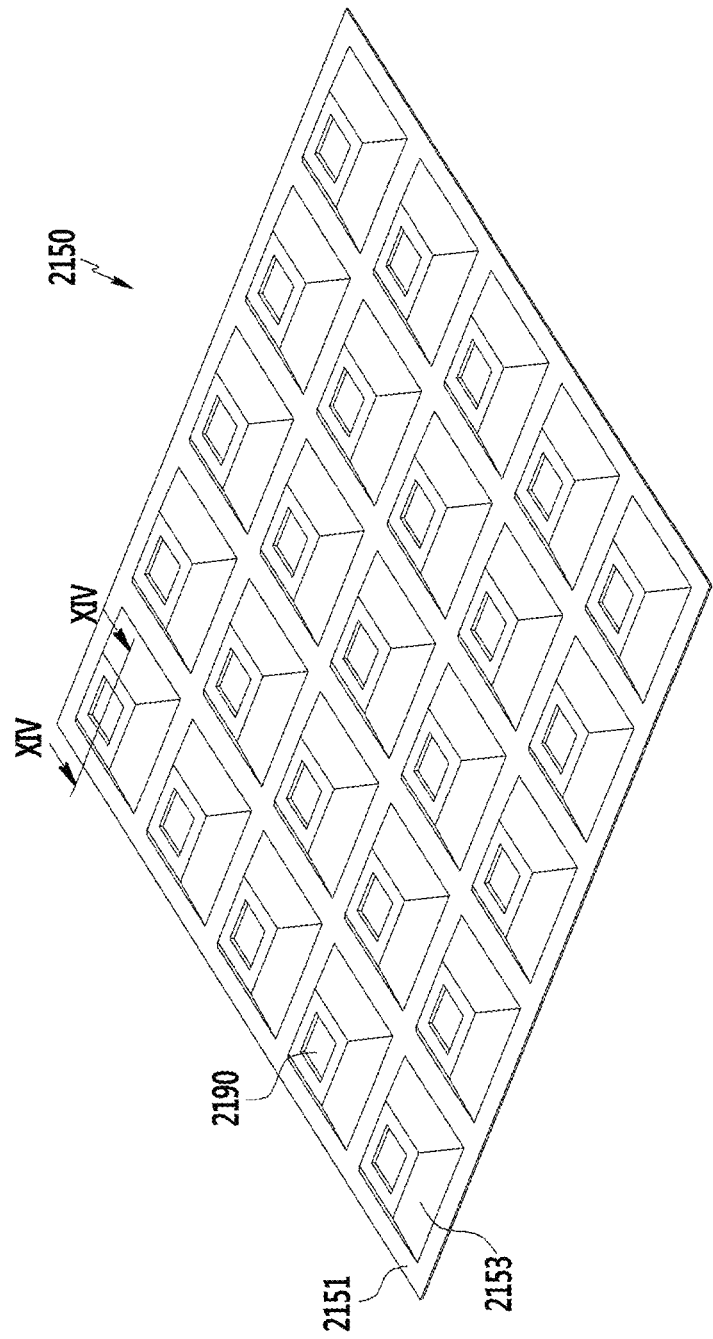
FIG. 13 is a perspective view showing the manufacturing method of the light source module according to an exemplary embodiment of the present disclosure.
Figure 14:
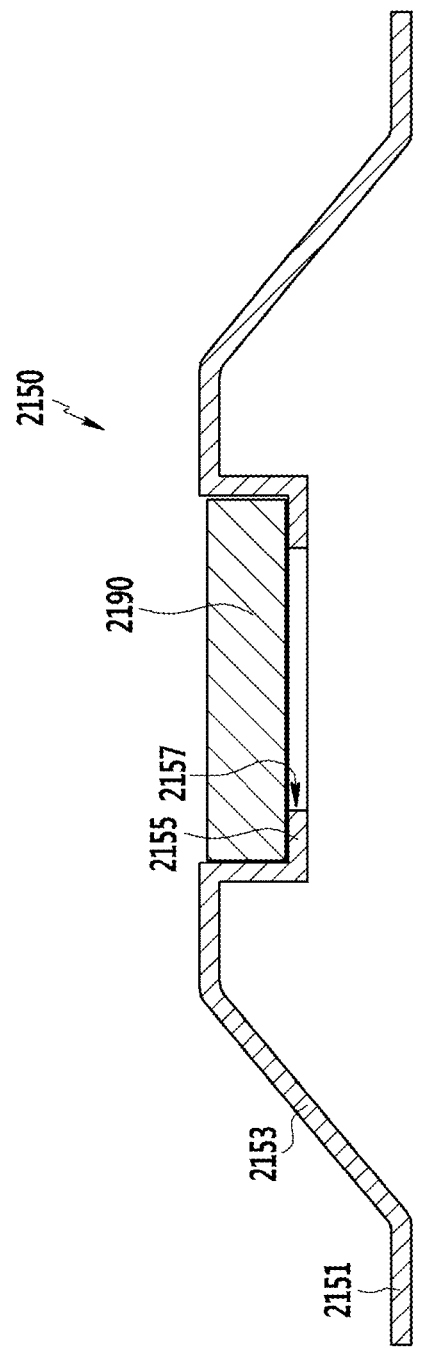
FIG. 14 is a cross-sectional view taken along line XIV-XIV of FIG. 13.

Next, as illustrated in FIGS. 10, 13, and 14, the wavelength converting part 2190 is fixed onto the first reflecting sheet 2150 (S200).

Here, the support part 2155 of the first reflecting sheet 2150 is formed with the same height as that of the wavelength converting part 2190 and the same width as that of the wavelength converting part 2190, such that the wavelength converting part 2190 is accommodated and fixed by the first reflecting sheet 2150.

Figure 15:
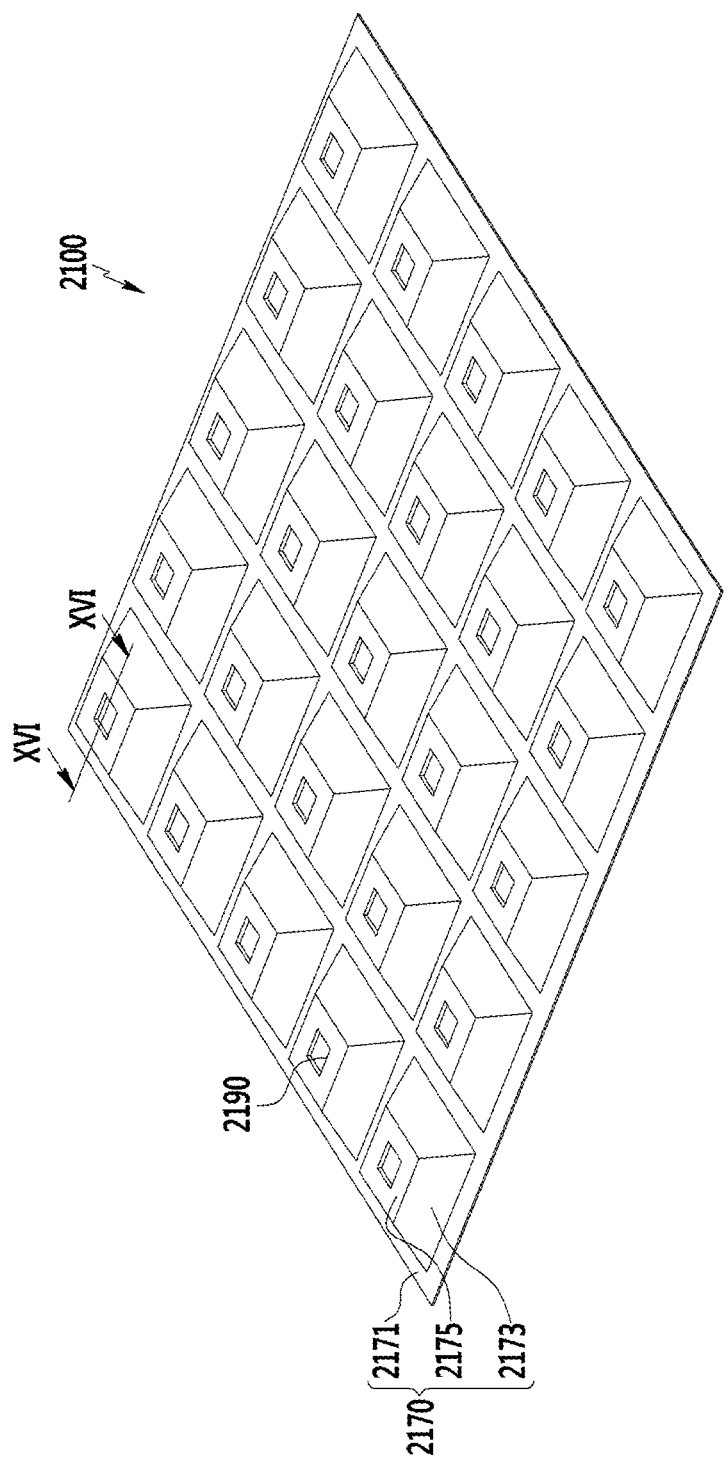
FIG. 15 is a perspective view showing the manufacturing method of the light source module according to an exemplary embodiment of the present disclosure.
Figure 16:
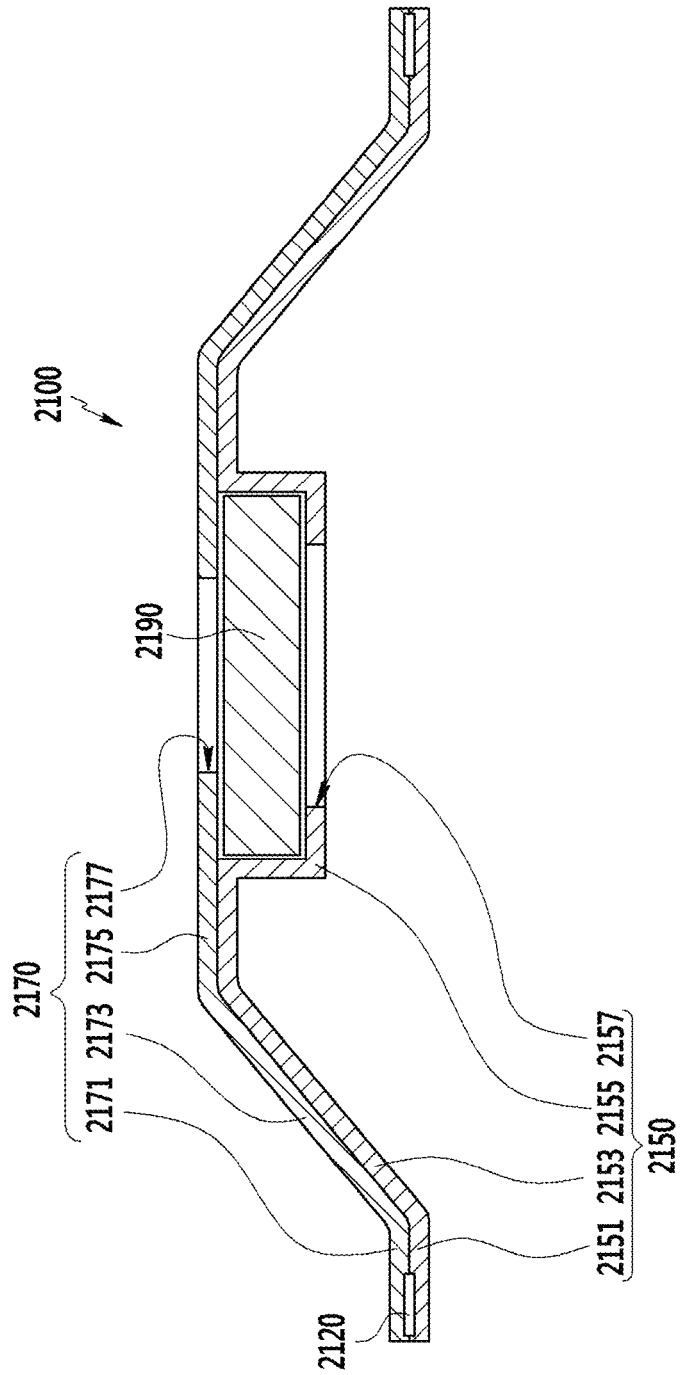
FIG. 16 is a cross-sectional view taken along line XV-XV of FIG. 15.

Next, as illustrated in FIGS. 10, 15, and 16, the second reflecting sheet 2170 is put on the first reflecting sheet 2150 and the wavelength converting part 2190 (S300).

The second reflecting sheet 2170 may include the second contact part 2171, the second body part 2173, the cover part 2175, and the second through-hole 2177.

The second contact part 2171 and the second body part 2173 have the same shapes as those of the first contact part 2151 and the second part 2153, respectively.

The cover part 2175 may cover a portion of the upper surface of the wavelength converting part 2190 and extend from the second body part 2173 in the horizontal direction.

That is, the first reflecting sheet 2150 and the second reflecting sheet 2170 may be overlapped with each other, and the wavelength converting part 2190 may be accommodated and fixed by the support part 2155 and the cover part 2175.

The adhering member 2120 made of a transparent material is positioned between the first contact part 2151 and the second contact part 2171, thereby adhering the first reflecting sheet 2150 and the second reflecting sheet 2170 to each other.

Figure 17:
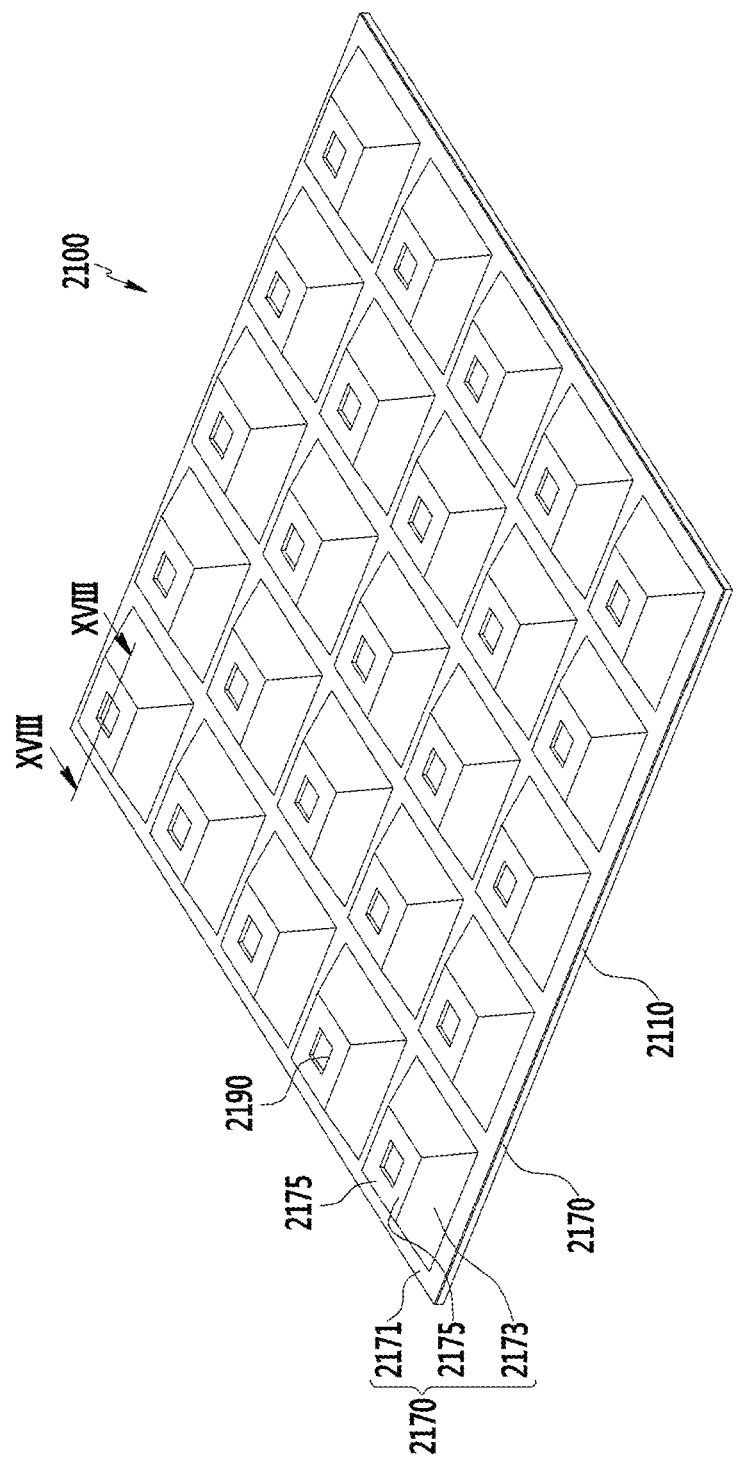
FIG. 17 is a perspective view showing the manufacturing method of the light source module according to an exemplary embodiment of the present disclosure.
Figure 18:
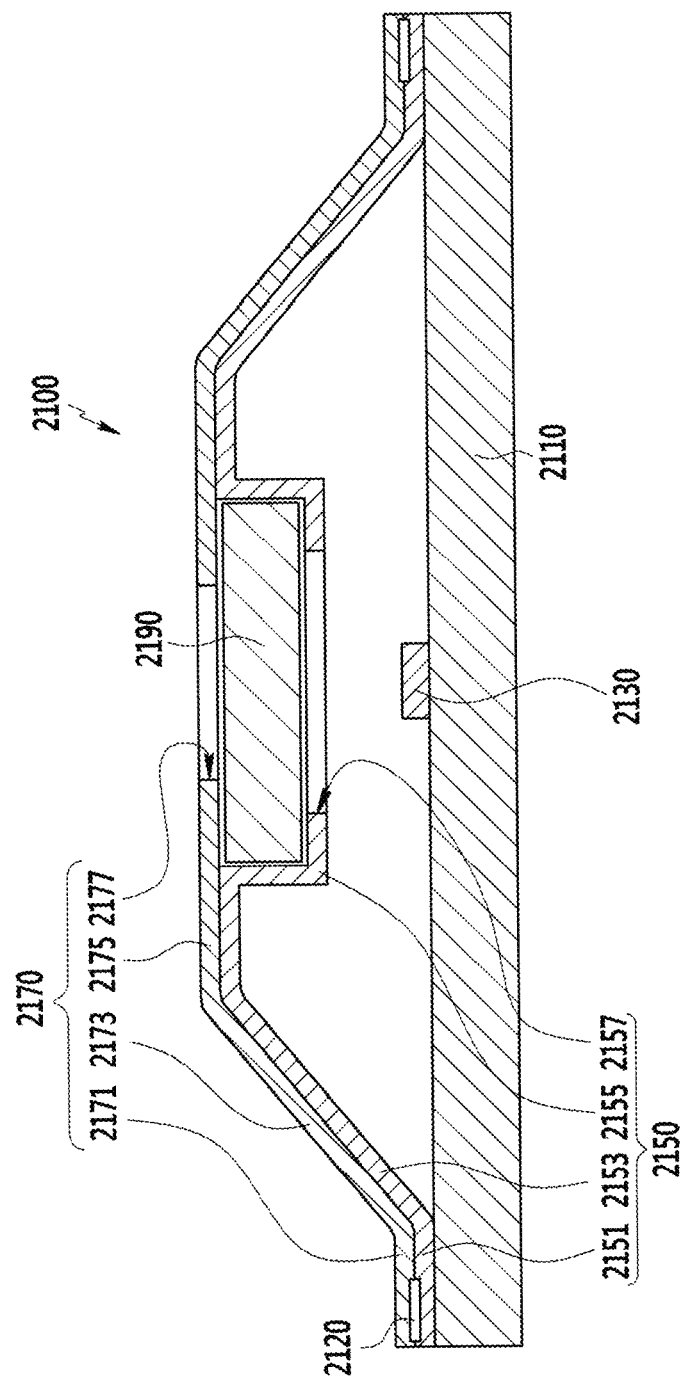
FIG. 18 is a cross-sectional view taken along line XVII-XVII of FIG. 17.

Next, as illustrated in FIGS. 10, 17, and 18, the first reflecting sheet 2150 and the second reflecting sheet 2170 are attached onto the substrate 2110 (S400).

The plurality of light emitting parts 2130 are disposed on the substrate 2110.

The first reflecting sheets 2150 and the second reflecting sheets 2170 are attached onto the substrate 2110 such that the wavelength converting parts 2190 are overlapped with the plurality of light emitting parts 2130.

Here, as shown in FIGS. 6 and 7, the support part 2155 of the first reflecting sheet 2150 according to another exemplary embodiment of the present disclosure may support a portion of the lower surface of the wavelength converting part 2190 and extend from the first body part 2153 in the horizontal direction, and the cover part 2175 of the second reflecting sheet 2170 may protrude upwardly from the second body part 2173 and cover the side surface of the wavelength converting part 2190 and a portion of the upper surface of the wavelength converting part 2190.

While the present system and method have been described in connection with exemplary embodiments, it is understood that the present system and method are not limited to the disclosed embodiments. On the contrary, the present system and method cover various modifications and equivalent arrangements included within the spirit and scope of the appended claims.

DESCRIPTION OF SYMBOLS

1000: display panel 2000: curved backlight unit
2100: light source module 2110: substrate
2130: light emitting part 2150: first reflecting sheet
2170: second reflecting sheet 2190: wavelength converting part
2300: light source enhancing member 4100: top chassis
4200: bottom chassis

What is claimed is:

1. A curved backlight unit comprising:
a light source module; and
a light source enhancing member disposed on the light source module,
wherein the light source module includes:
a substrate;
a light emitting part disposed on the substrate;
a first reflecting sheet spaced apart from the light emitting part by a predetermined distance and enclosing the light emitting part;
a second reflecting sheet contacting the first reflecting sheet; and
a wavelength converting part fixed between the first reflecting sheet and the second reflecting sheet and overlapped with the light emitting part.

2. The curved backlight unit of claim 1, wherein:
the first reflecting sheet includes:
a first contact part contacting the substrate;
a first body part spaced apart from the light emitting part by a predetermined distance and extending from the first contact part;
a support part supporting the wavelength converting part and extending from the first body part; and
a first through-hole through which light emitted from the light emitting part passes, and
the second reflecting sheet includes:
a second contact part contacting the first contact part;
a second body part adhered to the first body part;
a cover part covering a portion of the wavelength converting part and extending from the second body part; and
a second through-hole through which light emitted from the wavelength converting part passes.

3. The curved backlight unit of claim 2, wherein:
the support part supports a side surface of the wavelength converting part and a portion of a lower surface of the wavelength converting part and extends downwardly from the first body part, and the cover part covers a portion of an upper surface of the wavelength converting part and extends from the second body part in a horizontal direction.

4. The curved backlight unit of claim 2, wherein:
the support part supports a portion of a lower surface of the wavelength converting part and extends from the first body part in a horizontal direction, and the cover part covers a side surface of the wavelength converting part and a portion of an upper surface of the wavelength converting part and protrudes upwardly from the second body part.

5. The curved backlight unit of claim 2, wherein:
the first body part and the second body part extend from the first contact part and second contact part, respectively, at a predetermined angle from the substrate.

6. The curved backlight unit of claim 2, wherein:
the light source module is configured of a plurality of cells each including the first reflecting sheet, the second reflecting sheet, and the wavelength converting part.

7. The curved backlight unit of claim 6, wherein:
in the plurality of cells, adjacent first contact parts are connected to each other, and adjacent second contact parts are connected to each other.

8. The curved backlight unit of claim 6, wherein:
the plurality of cells are formed in a square shape of which each side is 30 mm or less.

9. The curved backlight unit of claim 6, wherein:
the plurality of cells are formed with a height of 5 mm or less from the substrate.

10. The curved backlight unit of claim 2, wherein:
thicknesses of the first reflecting sheet and the second reflecting sheets are in the range of 50 μm to 100 μm.

11. The curved backlight unit of claim 2, wherein:
the first through-hole is formed at a size larger than that of the second through-hole.

12. The curved backlight unit of claim 2, further comprising:
an adhering member disposed between the first reflecting sheet and the second reflecting sheet.

13. The curved backlight unit of claim 1, wherein:
the wavelength converting part includes a plurality of quantum dots.

14. The curved backlight unit of claim 13, wherein:
the wavelength converting part includes a first glass layer and a second glass layer, and
the plurality of quantum dots are covered with the first glass layer the second glass layer.

15. The curved backlight unit of claim 13, wherein:
the wavelength converting part converts light in a first wavelength band into light in second and third wavelength bands and emits the converted light.

16. The curved backlight unit of claim 15, wherein:
the light in the first wavelength band is light emitted by a blue light emitting diode (LED).

17. A manufacturing method of a curved backlight unit, comprising:
preparing a first reflecting sheet;

fixing a wavelength converting part onto the first reflecting sheet;
putting a second reflecting sheet on the first reflecting sheet and the wavelength converting part; and
attaching the first reflecting sheet and the second reflecting sheet onto a substrate including a light emitting part.

18. The manufacturing method of a curved backlight unit of claim 17, wherein:
the first reflecting sheet includes:
a first contact part contacting the substrate;
a first body part spaced apart from the light emitting part by a predetermined distance and extending from the first contact part;
a support part supporting the wavelength converting part and extending from the first body part; and
a first through-hole through which light emitted from the light emitting part passes, and
the second reflecting sheet includes:
a second contact part contacting the first contact part;
a second body part adhered to the first body part;
a cover part covering a portion of the wavelength converting part extending from the second body part; and
a second through-hole through which light emitted from the wavelength converting part passes.

19. The manufacturing method of a curved backlight unit of claim 18, wherein:
the support part supports a side surface of the wavelength converting part and a portion of a lower surface of the wavelength converting part and extends downwardly from the first body part, and the cover part covers a portion of an upper surface of the wavelength converting part and extends from the second body part in a horizontal direction.

20. The manufacturing method of a curved backlight unit of claim 18, wherein:
the support part supports a portion of a lower surface of the wavelength converting part and extends from the first body part in a horizontal direction, and the cover part covers a side surface of the wavelength converting part and a portion of an upper surface of the wavelength converting part and protrudes upwardly from the second body part.

21. A curved display device comprising:
a display panel; and
a curved backlight unit providing light to the display panel,
wherein the curved backlight unit includes:
a light source module; and
a light source enhancing member disposed on the light source module,
the light source module including:
a substrate;
a light emitting part disposed on the substrate;
a first reflecting sheet spaced apart from the light emitting part by a predetermined distance and enclosing the light emitting part;
a second reflecting sheet contacting the first reflecting sheet; and
a wavelength converting part fixed between the first reflecting sheet and the second reflecting sheet and overlapped with the light emitting part.

22. The curved display device of claim 21, wherein:
the first reflecting sheet includes:
a first contact part contacting the substrate;
a first body part spaced apart from the light emitting part by a predetermined distance and extending from the first contact part;
a support part supporting the wavelength converting part and extending from the first body part; and
a first through-hole through which light emitted from the light emitting part passes, and
the second reflecting sheet includes:
a second contact part contacting the first contact part;
a second body part adhered to the first body part;
a cover part covering a portion of the wavelength converting part and extending from the second body part; and
a second through-hole through which light emitted from the wavelength converting part passes.

23. The curved display device of claim 22, wherein:
the support part supports a side surface of the wavelength converting part and a portion of a lower surface of the wavelength converting part and extends downwardly from the first body part, and the cover part covers a portion of an upper surface of the wavelength converting part and extends from the second body part in a horizontal direction.

24. The curved display device of claim 22, wherein:
the support part supports a portion of a lower surface of the wavelength converting part and extends from the first body part in a horizontal direction, and the cover part covers a side surface of the wavelength converting part and a portion of an upper surface of the wavelength converting part and protrudes upwardly from the second body part.

* * * * *